United States Patent [19]

Akao

[11] Patent Number: 5,084,316
[45] Date of Patent: Jan. 28, 1992

[54] CONTAINER FOR PHOTOGRAPHIC FILM CARTRIDGE

[75] Inventor: Mutsuo Akao, Kanagawa, Japan
[73] Assignee: Fuji Photo Film Co., Ltd., Kanagawa, Japan
[21] Appl. No.: 447,903
[22] Filed: Dec. 8, 1989
[30] Foreign Application Priority Data
    Dec. 8, 1988 [JP] Japan .......... 63-158985[U]
[51] Int. Cl.$^5$ .............................. B27N 5/02
[52] U.S. Cl. ................... 428/36.92; 524/583; 524/584
[58] Field of Search ........ 428/36.92; 524/583, 524/584; 206/407

[56] References Cited
    U.S. PATENT DOCUMENTS
    4,639,386  1/1987  Akao .................. 428/36.92
    4,844,961  7/1989  Akao .................. 428/36.92
    4,921,737  5/1990  Akao .................. 428/36.92
    4,960,626 10/1990  Akao et al. ........... 428/36.92

Primary Examiner—James J. Seidleck
Attorney, Agent, or Firm—Burns, Doane, Swecker & Mathis

[57] ABSTRACT

A container body for a photographic film cartridge which comprises propylene-ethylene random copolymer resin composed of 96 to 98.5 wt. % of propylene units and 1.5 to 4 wt. % of ethylene units having a melt flow rate of 10 to 70 g/10 minutes and a molecular weight distribution of 2.5 to 5.5, Rockwell Hardness R of more than 80, and an organic nucleating agent. In the container body for a photographic film cartridge of the invention, breakage and cracking do not occur by the improvement in dropping strength. The white powder caused by the friction with the film cartridge packaged therein is prevented by the improvement of Rockwell hardness and wear resistance. The white powder caused by the sublimation or bleeding out of the organic nucleating agent is also prevented by the resin composition.

5 Claims, 2 Drawing Sheets

CONTAINER FOR PHOTOGRAPHIC FILM CARTRIDGE

BACKGROUND OF THE INVENTION

1. Field of the Invention

This invention relates to a plastic container for placing a photographic film cartridge.

2. Description of the Prior Art

At the present time, most of the container bodies for photographic film cartridge are made of plastic and molded by injection molding. The form is, for example, shown in U.S. Pat. No. 4,639,386.

The container, as illustrated in FIG. 1, consists of container body 1 and cap 2, and it can protect a photographic film cartridge placed therein in an airtight state merely by fitting the cap 2 to the container body 1. The container body 1 is in cylindrical form and has a bottom. The opening end portion 3 is slightly thickened, and a round groove 4 is formed circumferentially on the inside thereof. The cap 2 is composed of relatively thick flange 5, peripheral wall portion 6 formed downward from the inner end of the flange 5 and protruded center portion 7 for receiving the core of the film cartridge (not illustrated). Round rib 8 for fitting to the groove 4 is formed near the center of the peripheral wall portion 6, and as shown in FIG. 2, it contacts the bottom portion 9 of the groove 4 to form a sealing state.

It is known to form such a container body 1 from propylene-ethylene random copolymer resin (Japanese Patent KOKAI No. 63-193142) which is stronger than homopolypropylene resin in dropping strength. However, when the ethylene unit is incorporated in polypropylene resin, Rockwell hardness decreases. Wear resistance also decreases, and white powder is generated by the friction with the film cartridge or the like. It is known to add an organic nucleating agent in order to prevent white powder generation by increasing the rigidity of the container body. The blending effect of organic nucleating agent varies according to the content of ethylene unit, properties of propylene-ethylene random copolymer resin and the like. While, organic nucleating agent is sublimed at a high temperature, and the vapor is deposited by cooling to produce white powder. Moreover, white powder is also generated by blending or thermal decomposition so as to adhere to the parting portion and the like of the mold. Since white powder adheres to the mold, it is necessary to interrupt molding at a prescribed intervals to remove the white powder. This is a great problem for automatization or unmanned continuous molding. Moreover, since propylene-ethylene random copolymer resin itself has the property to be whitened by dropping shock and is inferior in transparency, it was never put to practical use for container bodies for photographic film cartridges, though it is excellent in impact strength.

SUMMARY OF THE INVENTION

An object of the invention is to provide a container body for a photographic film cartridge excellent in dropping strength which is not broken or cracked by dropping or other great shock.

Another object of the invention is to provide a container body for a photographic film cartridge excellent in wear resistance which does not generate white powder through the delivery of the empty container body, the insertion of a photographic film cartridge and physical distribution of the photographic film placed therein.

Another object of the invention is to provide a container body for a photographic film cartridge wherein the nucleating agent blended therein does not become white powder.

The present inventor has investigated the relationship between propylene-ethylene random copolymers and organic nucleating agents from various viewpoints, and has invented a container body for a photographic film cartridge by using a resin composition where the effects of the blended ethylene unit and organic nucleating agent are exhibited effectively.

Thus, the present invention provides a container body for a photographic film cartridge which comprises propylene-ethylene random copolymer resin composed of 96 to 98.5 wt. % of propylene units and 1.5 to 4 wt. % of ethylene units having a melt flow rate of 10 to 70 g/10 minutes, a molecular weight distribution of 2.5 to 5.5, and Rockwell Hardness R of more than 80, and an organic nucleating agent.

DETAILED DESCRIPTION OF THE INVENTION

Figure 1:
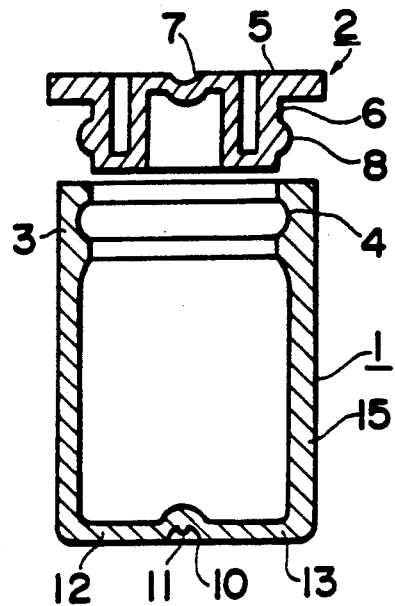
FIG. 1 is a sectional side view illustrating a container body embodying the invention and a cap thereof separated from the body.
Figure 2:
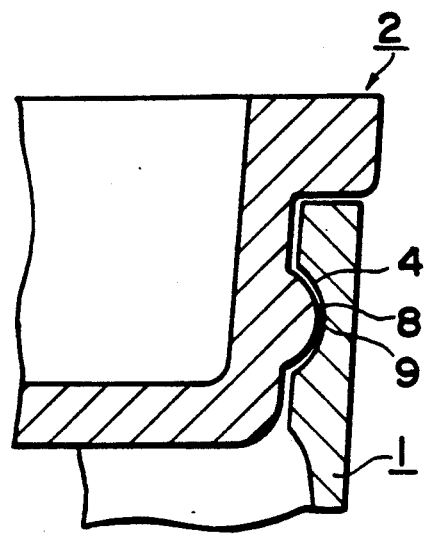
FIG. 2 is an enlarged partial view thereof.

The propylene unit content of the propylene-ethylene random copolymer resin is 96 to 98.5 wt. %. When the propylene unit content is less than 96 wt. %, rigidity is low. Surface hardness is also low, and white powder is liable to adhere to the perforated portion and the terminal portion of photographic film by the friction with the film cartridge placed therein. While, when the content is beyond 98.5 wt. %, Izod impact strength decreases, and cracks are liable to occur. The ethylene content is 1.5 to 4 wt. %, preferably 2.5 to 3.5 wt. %. When the ethylene content is less than 1.5 wt. %, dropping impact strength is insufficient, and transparency is not improved. While, it is beyond 4 wt. %, the blending effect of the organic nucleating agent is insufficient. Rockwell hardness is low, and white powder is generated by the friction. Scratches, deformation, buckling and the like are liable to occur, and the fitting strength to the cap decreases. The melt flow rate (ASTM D-1238, measured at 230° C. at a load of 2.16 kgf, hereinafter referred to as MFR) is 10 to 70 g/10 minutes, preferably 20 to 50 g/10 minutes. When the MFR is less than 10 g/10 minutes, molecular orientation occurs in the longitudinal direction which tends to induce cracking. The resin fluidity is inferior, and molding troubles such as short shot frequently occur. While, when the MFR is beyond 70 g/10 minutes, surface hardness is low, and white powder is liable to be generated by the abrasion of both the inner and outer walls. Rigidity is also low, and deformation occurs. The molecular weight distribution (weight average molecular weight/number average molecular weight) of the propylene-ethylene random copolymer resin is 2.5 to 5.5, preferably 3 to 4.5, measured by the gel permeation chromatography (GPC). When the molecular weight distribution is less than 2.5, fluidity decreases resulting in increased molding toubles such as short shot. While, when the molecular weight distribution is beyond 5.5, the blending effect of the organic nucleating agent is small. Rigidity and the like are not improved, and deformation and white powder occur. Mold shrinkage, transparency and impact strength are also problems.

The organic nucleating agent improves the crystallization rate, prevents deformation and white powder generation and improves physical properties. That is, even when the cooling time is shortened, bottom sink marks and buckling rarely occur by increasing the rigidity and crystallization rate of the resin composition. Moreover, deformation only slightly occurs, even in the case were a great quantity of the molded products is placed in a hopper or a container for transportation immediately after molding. It is also possible to improve Rockwell hardness and wear resistance, and these exhibit great effects upon the prevention of white powder occurrence in high speed processing or transportation of empty container bodies. Preferred organic nucleating agents include 1,3,2,4-di (methylbenzylidene)sorbitol, 1,3,2,4-di(ethylbenzylidene) sorbitol, 1,3,2,4-di(propylbenzylidene)sorbitol, 1,3,2,4-di (methoxybenzylidene)-sorbitol, 1,3,2,4-di(ethoxybenzyliene) sorbitol, 1,3,2,4-di(p-methylbenzylidene)sorbitol, 1,3,2,4-di(p-chlorobenzylidene)sorbitol, 1,3,2,4-di (alkylbenzylidene)sorbitol, 1,3,2,4-bis(methylbenzylidene) sorbitol, aluminum benzoate, and the like. Dibenzylidene sorbitol compounds are particularly preferred. Two or more organic nucleating agents may be combined, or the organic nucleating agent may be combined with an inorganic nucleating agent. A suitable content of the organic nucleating agent is 0.01 to 1 wt. %. When the content is less than 0.01 wt. %, the blending effect of the organic nucleating agent is insufficient. While, when the content is beyond 1 wt. %, the increase of the blending effect is does not significantly increase by increasing the quantity of the nucleating agent. Moreover, the excess amount of the nucleating agent causes various troubles, such as adverse influence upon photographic film, adhesion to the mold, bleeding out and sharp decrease of dropping strength, according to the kind of the nucleating agent. As the blending method of the organic nucleating agent, there are the compound method, the dry blending method, the masterbatch method is preferred. Since the organic nucleating agent is bulky and readily scattered, it is difficult to blend as is. Therefore, to blend a small amount of dispersing agent or a wetting agent is preferred. Effective dispersing agents include carboxylic anhydrides and higher fatty acids, and lubricants such as oleic amide are particularly preferred. As the wetting agent, plasticizers such as DOP and DHP are usable. When 1,3,2,4-dibenzylidenesorbitol or a derivative thereof is made into a masterbatch of which the concentration is several times to several tens of times of the container body, the blending cost is reduced. Moreover, the nucleating agent is not scattered, and is dispersed well even in low temperature molding. The other additives can also be uniformly dispersed. It is preferable to coat the surface of the organic nucleating agent with a fatty acid, a fatty acid compound, a coupling agent, a surfactant or the like. By coating the surface of the nucleating agent with or blending with the pure fatty acid or fatty acid compound such as a higher fatty acid, a fatty acid amide or a fatty acid metal salt, the dispersing effect is enhanced and bleeding is prevented.

To blend a lubricant, a surfactant or a transparent conductive material is preferred in view of rendering the improvement in the properties such as rigidity by the blending of the organic nucleating agent more effective. By blending these additives, the rigidity increases, and the generation of white powder by abrasion reduces. The generation of white powder caused by the crystallization or bleeding out of the organic nucleating agent is also reduced. The unfavorable odor of the organic nucleating agent is prevented, and mold separability, antistatic property and antiblocking property are also improved.

A suitable content of the lubricant is 0.01 to 5 wt. %, and 0.05 to 2 wt. % is preferred. When the content is less than 0.01 wt. %, the blending effect is insufficient. When the content is beyond 5 wt. %, screw slip occurs even in the case of fatty acids and fatty acid metal salts having less improvement in slipping character and blending ability with a resin is degraded. Particularly, in the case of the lubricant having a great effect to improve slipping character such as fatty acid amides, unless the content is less than 1 wt. %, screw slip occurs, and bleeding out also occurs. Examples of commercial lubricants suitable for the invention include:

Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes, modified thereof, etc. (Sinetsu Chemical Co., Ltd., Toray Silicone Co., Ltd.), etc.

Alkylamine lubricants; "ELECTROSTRIPPER TS-2" (Kao Corp.), etc.

Hydrocarbon lubricants; liquid paraffin, natural paraffin, microwax, synthetic paraffin, polyethylene wax, polypropylene wax, chlorinated hydrocarbon, fluorocarbon, etc.

Fatty acid lubricants; higher fatty acids preferably more than $C_{12}$, hydroxy fatty acids, etc.

Ester lubricants; fatty acid lower alcohol esters, fatty acid polyol esters, fatty acid polyglycol esters, fatty acid fatty alcohol esters, etc.

Alcohol lubricants; polyols, polyglycols, polyglycerols, etc.

Metallic soap; metal salts such as Li, Mg, Ca, Sr, Ba, Zn, Cd, Al, Sn, Pb salts of higher fatty acids such as lauric acid, stearic acid, ricinoleic acid naphthenic acid, oleic acid, etc.

Suitable surfactants are:

Nonionic surfactants; polyethylene glycol fatty acid esters, polyoxyethylene sorbitan fatty acid esters, polyoxyethylene fatty alcohol ethers, polyoxyethylene alkylphenyl ethers, polyoxyethylene glycerine fatty acid esters, polyoxyethylene fatty amines, sorbitan monofatty acid esters, fatty acid pentaerythritol, ethylene oxide adducts of fatty alcohols, ethylene oxide adducts of fatty acids, ethylene oxide adducts of amino fatty acids or fatty acid amides, ethylene oxide aducts of alkylphenols, ethylene oxide adducts of alkylnaphthols, ethylene oxide adducts of partial fatty acid esters of polyols, other nonionic surfactants disclosed on page 120 of Japanese Patent KOKOKU No. 63-26697.

Anionic surfactants; sodium salt of ricinoleic acid sulfate ester, various metal salts of fatty acids, ricinolate ester sulfate ester sodium salt, sulfated ethylamiline oleate, sulfate esters of olefins, sodium salt of oleyl alcohol sulfate ester, alkylsulfate ester salts, fatty acid ethylsulfonate salts, alkylsulfonate salts, alkyl naphthalene sulfonate salts, alkylbenzene sulfonate salts, succinate ester sulfonate salts, phosphate ester salts, etc.

Cationic surfactants; primary amine salts, tertiary amine salts, quaternary ammonium salts, pyridine derivatives, etc.

Ampholytic surfactants; carboxylic acid derivatives, imidazoline derivatives, betaine derivatives, etc.

Nonionic surfactants and cationic surfactants are preferred, because of not affecting photographic film adversely and of preventing the generation of static electricity. A suitable content of the surfactant is 0.01 to 5 wt. %. When the content is less than 0.01 wt. %, the blending effect of the surfactant is insufficient. While, when the content is beyond 5 wt. %, the increase of the blending effect is not significantly increased by increasing the blending quantity of the surfactant. Moreover, the excess amount of the surfactant causes various troubles, such as adverse influence upon photographic film, adhesion of dust caused by bleeding out and decrease of transparency, according to the kind of the surfactant.

As suitable conductive materials capable of preventing the generation of static electricity, there are the above surfactants for transparent container bodies. For colored container bodies, there are carbon black, graphite, metal surface-coating pigment, metal powders such as silver, aluminum, zinc, nickel, stainless steel, tin, iron, lead and copper, metal flakes such as aluminum, zinc and tin, aluminum paste, carbon fibers, metal fibers, whiskers such as potassium titanate, aluminum nitride and alumina, and the like, and they are selected according to the requirement to prevent the generation of static electricity. A suitable content of the conductive material is 0.01 to 5 wt. %. When the content is less than 0.01 wt. %, the blending effect is insufficient. While, when the content is beyond 5 wt. %, impact strength decreases, and powder is liable to be generated.

In order to mold continuously the container body for a photographic film cartridge efficiently, blending an antioxidant is preferred. Suitable antioxidants are described below. Phenol Antioxidants:
6-t-butyl-3-methylphenol derivatives,
2,6-di-t-butyl-p-cresol,
2,2'-methylenebis-(4-ethyl-6-t-butylphenol),
4,4'-butylidenebis(6-t-butyl-m-cresol),
4,4'-thiobis(6-t-butyl-m-cresol),
4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) propionate]methane, etc.

Ketone-Amine Condensate Antioxidants:
6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:
Phenyl-α-naphthylamine, N-phenyl-β-naphthylamine, N-phenyl-N'-isopropyl-p-phenylenediamine, N,N'-diphenyl-p-phenylenediamine, N,N'-di-p-naphthyl-p-phenylenediamine, N-(3'-hydroxybutylidene)-1-naphthylamine, etc.

Imidazole Antioxidants:
2-mercaptobenzoimidazole, zinc salt of 2-mercaptobenzoimidazole,
2-mercaptomethylbenzoimidazole, etc.

Phosphite Antioxidants:
Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:
Thiourea derivatives, 1,3-bis(dimethylaminopropyl)-2-thiourea, etc.

Sulfur Antioxidants:
Dilaurylthiodipropionate, dimyristylthiodipropionate, laurylstearylthiodipropionate, distearylthiodipropionate, etc.

Other Antioxidants:
Those useful for air oxidation, such as dilauryl thiodipropionate, etc.

A suitable content of the antioxidant is 0.01 to 1 wt. %.

In order to prevent unfavorable odor of the organic nucleating agent, the addition of a coupling agent is preferred. Suitable coupling agents include silane coupling agents such as vinylsilane coupling agents, acrylsilane coupling agents, epoxysilane coupling agents, aminosilane coupling agents and mercaptosilane coupling agents. Various other coupling agents such as titanate coupling agents, chromium coupling agents and aluminum coupling agents are also usable. A suitable content of the coupling agent is 0.01 to 5 wt. %.

Various additives may be added to the resin composition composing the container body of the invention. Examples of the additives are described below.

(1) Plasticizer;
phthalic acid esters, glycol esters, fatty acid esters, phosphoric acid esters, etc.

(2) Stabilizer;
lead compounds, cadmium compounds, zinc compounds, alkaline earth metal compounds, organic tin compounds, etc.

(3) Flame retardant;
phosphoric acid esters, phosphoric acid ester halides, halides, inorganic materials, polyols containing phosphorus, etc.

(4) Filler;
alumina, kaolin, clay, calcium carbonate, mica, talc, titanium dioxide, silica, etc.

(5) Reinforcing agent;
glass lobing, metallic fiber, glass fiber, glass milled fiber, carbon fiber, etc.

(6) Coloring agent;

inorganic pigments (Al, Fe$_2$O$_3$, TiO$_2$, CdS, etc.) organic pigments, dyes, etc.

(7) Vulcanizing agent;
vulcanization accelerator, acceleration assistant, etc.

(8) Deterioration preventing agent;
ultraviolet absorber, metal deactivator, peroxide decomposing agent, etc.

(9) Various thermoplastic resins, elastomers, rubbers, etc.

The Rockwell strength (R) (ASTM D-785) of the container body of the invention is more than 80, and more than 90 is particularly preferred in view of the prevention of white powder generation, the prevention of abrasion, the improvement in moldability and the like.

When the container body of the invention is molded by injection molding, since the projected portion (gate mark) 11 remains at the gate portion 10 in FIG. 1, the gate portion 10 is preferably indented 0.5 to 5 mm, particularly 1 to 3 mm, from the bottom surface 12. A preferred mean thickness of the peripheral wall 15 is 0.5 to 1.3 mm, and 0.7 to 1 mm is particularly preferred.

The injection molding method may be the most typical method of single molding or any other method such as injection blow molding, intermold vacuum injection molding, stack molding and the like can also be used.

Figure 3:
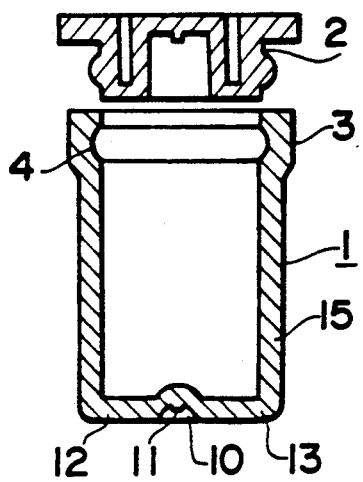
FIG. 3 and FIG. 4 are sectional side views illustrating other container bodies also embodying the invention and caps thereof separated from the body, respectively.
Figure 4:
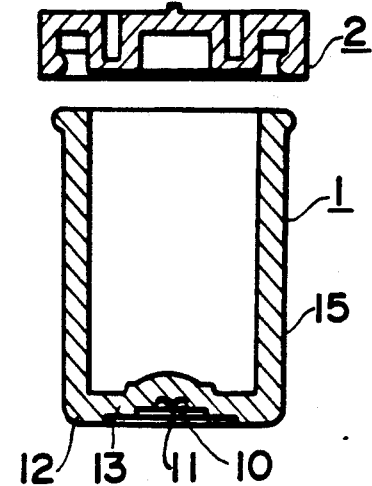
Figure 5:
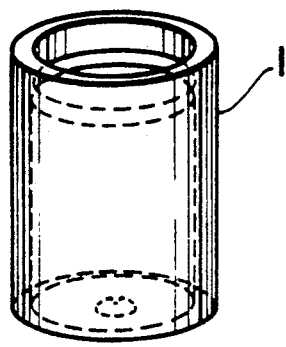
FIG. 5 through FIG. 7 are perspective views of still other container bodies embodying the invention.
Figure 6:
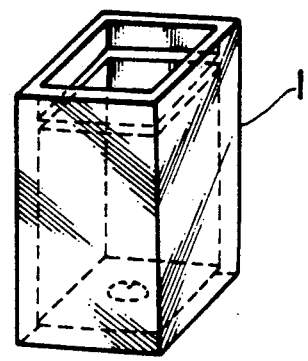
Figure 7:
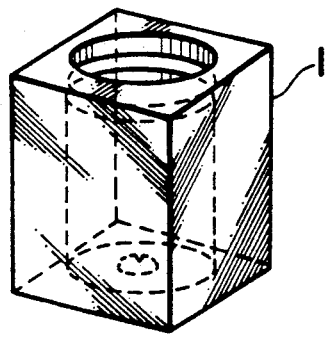

The container body of the invention may be any shape capable of placing a photographic film cartridge therein. However, preferred container bodies are shown in FIG. 1 which are excellent in fitting with the cap thereof and seal sufficiently and detach readily. Examples of such a container body are shown in FIG. 3 to FIG. 7. The container bodies of FIG. 3 to FIG. 5 are cylindrical, and the container body of FIG. 6 is rectangular. The container body of FIG. 7 is formed cylindrical on the inside portion to placed a film cartridge and rectangular on the outside portion.

The material of the cap is preferably more flexible than the container body 1 in order to improve the fitting sealability to the container body and to exhibit the aforementioned functions sufficiently. Preferred materials include low density polyethylene resin, L-LDPE resin, various blend resins of the above resins and other thermoplastic resins. To add 0.01 to 0.6 wt. % of fatty acid amide lubricant is preferred in view of improving injection moldability and antistatic property.

The resin composition used for the container body of the invention is also suitable for hinged transparent cases for microfilm, instant film and the like, lid-fitting boxes such as faucet type and general cardboard box type, 8 mm VTR cases, other VTR cases, cassette tape cases, floppy disk cases, optical disk cases, containers for medicine, containers for foods and the like disclosed in Japanese Patent KOKAI Nos. 59-197900 and 62-260664, Japanese Utility Model KOKAI Nos. 54-100617, 54-170818, 58-81774, 59-77144, 60-120968, 60-188180, 61-45386, 61-69079, 61-69562, 61-150774, 62-9259, 62-33508, 62-54990, 62-101777, 62-101785, 62-193284, 63-40382, 63-76656, 63-40382, 63-76656, 63-76678, 63-86056, 63-102636, etc.

The container body of the invention may be used for various containers such as medicines, seeds or liquids requiring sealability by changing the form or the type, printing or attaching a label.

In the container body for a photographic film cartridge of the invention, breakage and cracking do not occur by the improvement of dropping strength. The white powder caused by the friction with the film cartridge packaged therein is prevented by the improvement of Rockwell hardness and wear resistance. The white powder caused by the sublimation or bleeding out of the organic nucleating agent is also prevented by the resin composition.

EXAMPLES

Two examples of the container body of the invention, three comparative container bodies and one conventional container body were molded by using the molding machine "NETSTAL" (Sumitomo Heavy Industries Ltd.) operated at a mold clamping pressure of 150 t. The type of runner is hot runner, and the molding number per cycle was 24. The form of respective container bodies was the same as shown in FIG. 1, and the peripheral wall thickness was 0.8 mm on average.

The container body of Example I was formed of the resin composition of 99.5 wt. % of the propylene-ethylene random copolymer resin having a propylene unit content of 97 wt. %, i.e. an ethylene unit content of 3 wt. %, a MFR of 40 g/10 minutes, a molecular weight distribution ($\overline{M}w/\overline{M}n$) of 5.1, a Rockwell hardness R of 92 and an Izod impact strength of 4.3 kg cm/cm, 0.2 wt. % of oleic amide, 0.1 wt. % of alkylamine antistatic agent and 0.2 wt. % of the organic nucleating agent of 1,3,2,4-di-(methylbenzylidene)sorbitol.

The container body of Example II was formed of the resin composition of 99.4 wt. % of the propylene-ethylene random copolymer resin having a propylene unit content of 96.5 wt. %, i.e. an ethylene unit content of 3.5 wt. %, a MFR of 40 g/10 minutes, a molecular weight distribution of 4.1, a Rockwell hardness R of 90 and an Izod impact strength of 5.2 kg.cm/cm, 0.2 wt. % of oleic amide, 0.2 wt. % of calcium stearate and 0.2 wt. % of 1,3,2,4-di-(methylbenzylidene)sorbitol.

The container body of Comparative Example I was formed of the resin composition of 99.6 wt. % of propylene-ethylene random copolymer resin having a propylene unit content of 95.8 wt. %, i.e. an ethylene unit content of 4.2 wt. %, a MFR of 40 g/10 minutes, a molecular weight distribution of 5.6, a Rockwell hardness R of 75 and an Izod impact strength of 5.5 kg cm/cm, 0.2 wt. % of oleic amide and 0.2 wt. % of 1,3,2,4-di-(benzylidene)sorbitol.

The container body of Comparative Example II was formed of the resin composition of 99.7 wt. % of propylene-ethylene random copolymer resin having a propylene unit content of 97.0 wt. %, i.e. an ethylene unit content of 3.0 wt. %, a MFR of 25 g/10 minutes, a molecular weight distribution of 3.2, a Rockwell hardness R of 78 and an Izod impact strength of 4.0 kg cm/cm, 0.1 wt. % of oleic amide and 0.2 wt. % of a benzoate nucleating agent.

The container body of Comparative Example III was formed of propylene-ethylene random copolymer resin having a propylene unit content of 96.5 wt. %, i.e. an ethylene unit content of 3.5 wt. %, a MFR of 40 g/10 minutes, a molecular weight distribution of 4.1, a Rockwell hardness R of 84 and an Izod impact strength of 3.0 kg.cm/cm alone.

The container body of Conventional Example I was formed of homopolypropylene resin having a MFR of 5 g/10 minutes, a molecular weight distribution of 5.79, a Rockwell hardness R of 95 and an Izod impact strength of 1.6 kg·cm/cm.

All of the above container bodies contained 500 ppm of a phenol antioxidant.

Various properties of the above container bodies were measured, and the results are summarilzed in Table 1.

TABLE 1

|  | Example I | Example II | Comparative Example I | Comparative Example II | Comparative Example III | Conventional I |
|---|---|---|---|---|---|---|
| Polypropylene Resin | Random | Random | Random | Random | Random | Homo |
| Ethylene Content (%) | 3.0 | 3.5 | 4.2 | 3.0 | 3.5 | 0 |
| MFR (g/10 min.) | 40 | 40 | 40 | 25 | 40 | 5 |
| Mw/Mn | 5.1 | 4.1 | 5.6 | 3.2 | 4.1 | 5.79 |
| Rockwell Hardness | 92 | 90 | 75 | 78 | 74 | 95 |
| Izod Impact Strength (kg cm/cm) | 4.3 | 5.2 | 5.5 | 4.0 | 3.0 | 1.6 |
| Nucleating Agent | DMBS*1 | DMBS | DMBS | Bz*2 | None | None |
| Content (wt. %) | 0.2 | 0.2 | 0.2 | 0.2 | 0 | 0 |
| Lubricant | OA*3 | OA | OA | OA | None | None |
| Content (wt. %) | 0.2 | 0.2 | 0.2 | 0.1 | 0 | 0 |
| Conductive Material | AA*4 | SCa*5 | None | None | None | None |
| Content (wt. %) | 0.1 | 0.2 | 0 | 0 | 0 | 0 |
| Transparency | A | A | B | D | E | E |
| (cm) | 138 | 147 | 113 | 62 | 38 | 31 |
| White Powder | A | B | E | D | D | B |
| Cracking | A | A | A | B | D | E |
| (%) | 2 | 0 | 0 | 12 | 26 | 85 |
| Antistatic Property | A | A | B | C | D | D |
| Antiblocking Property | A | A | A | B | E | B |
| Injection Moldability | A | B | A | D | E | E |

Evaluations in Table 1 were carried out as follows:

A very excellent
B excellent
C practical
D having a problem
E impractical

Testing methods were as follows:

MFR: ASTM D-1238
Mw/Mn: GPC method
Rockwell Hardness: ASTM D-785
Izod Impact Strength: ASTM D-256 (Notched Strength)

Transparency:
Each container body was gradually moved far from the transparency inspection chart of a white paper on which parallel lines each 0.5 mm in thickness were drawn at an interval of 2 mm. The transparency is expressed as the distance (cm) at which the parallel lines could not be seen.

White Powder:
A photographic film placed in a cartridge was put in each container body with rotation, and the amount of white powder generated caused by the abrasion of the inner surface adhered to the photographic film was judged by visual inspection.

Cracking:
A cartridge containing 36 exposures photographic film was placed in each container, and a cap was attached. The container was dropped to concrete floor from 5 m height at room temperature (20° C.), and the number of the cracked container bodies per 100 pieces was indicated in Table 1.

Antistatic Property:
The voltage of the static electrification of each container body was measured by a volt meter, when 2000 pieces of the container body were molded and placed in a polyethylene bag.

Antiblocking Property:
10,000 pieces of container body were placed in a hopper having a bottom angle of 30 degrees, and judged by the movability to the dropping exit.

Injection Moldability:
Judged by the occurence of molding troubles such as short shot and bottom sink marks, releasability from the mold and molding cycle, collectively.

*1 1,3,2,4-di-(methylbenzylidene)sorbitol
*2 Benzoate nucleating agent
*3 Oleic amide lubricant
*4 Alkylamine antistatic agent
*5 Calcium stearate

I claim:

1. A container body for a photographic film cartridge which comprises propylene-ethylene random copolymer resin composed of 96 to 98.5 wt. % of propylene units and 1.5 to 4 wt. % of ethylene units, said resin having a melt flow rate of 10 to 70 g/10 minutes, Rockwell Hardness R of more than 80, a molecular weight distribution of 2.5 to 5.5 and 0.01 to 1 wt. % of a dibenzylidene sorbitol compound.

2. The container body of claim 1 which further contains 0.01 to 5 wt. % of a transparent conductive material.

3. The container body of claim 1 which further contains 0.01 to 5 wt. % of a lubricant.

4. The container body of claim 1 which further contains 0.01 to 1 wt. % of an antioxidant.

5. The container body of claim 1 which further contains 0.01 to 5 wt. % of a coupling agent.

* * * * *